United States Patent [19]
Kuwahara et al.

[11] Patent Number: 5,388,904
[45] Date of Patent: Feb. 14, 1995

[54] THERMAL INSULATION BOX

[75] Inventors: Makoto Kuwahara, Ouizumi; Kakuji Kume, Ashikaga; Eiichi Masuko, Ouizumi; Atsushi Saitou, Ojima; Katsuhiro Fukuda; Takashi Araki, both of Ouizumi; Yuuji Hosoda, Oura, all of Japan

[73] Assignee: Sanyo Electric Co., Ltd, Moriguchi, Japan

[21] Appl. No.: 185,173

[22] Filed: Jan. 24, 1994

Related U.S. Application Data

[63] Continuation of Ser. No. 956,031, Oct. 2, 1992, abandoned, which is a continuation of Ser. No. 648,456, Jan. 30, 1991, Pat. No. 5,174,640.

Foreign Application Priority Data

Jan. 31, 1990 [JP] Japan .................. 2-22376

[51] Int. Cl.⁶ .............................. F25D 11/00
[52] U.S. Cl. .................. 312/406.2; 312/407
[58] Field of Search ............ 312/400, 406, 406.2, 312/407, 407.1

[56] References Cited

U.S. PATENT DOCUMENTS

| | | |
|---|---|---|
| 2,837,900 | 6/1958 | Harle . |
| 3,726,578 | 4/1973 | Armstrong . |
| 3,868,152 | 2/1975 | Dixon . |
| 4,330,310 | 5/1982 | Tate, Jr. et al. . |
| 4,399,666 | 8/1983 | Sakutori . |
| 5,174,640 | 12/1992 | Kawahara et al. .......... 312/407 |

FOREIGN PATENT DOCUMENTS

| | | |
|---|---|---|
| 0633899 | 1/1962 | Canada ................. 312/406.2 |
| 0584770 | 11/1958 | Italy ..................... 312/406 |

Primary Examiner—Kenneth J. Dorner
Assistant Examiner—Gerard A. Anderson
Attorney, Agent, or Firm—Armstrong, Westerman, Hattori, McLeland & Naughton

[57] ABSTRACT

A partitioning member having therein a space is provided at the opening of a thermal insulation box having an outer and inner boxes forming a space in between said outer and inner boxes. The two spaces communicate with each other and filled integrally with a thermal insulation material by injecting into the space between said outer and inner box an expandable thermal insulation material, which diffuses into the space inside said partitioning member, to thereby provide in a simple and economical way a thermal insulation box having a small number of components but as uniform thermal insulation.

10 Claims, 20 Drawing Sheets

THERMAL INSULATION BOX

This application is a continuation of application Ser. No. 07/956,031 filed Oct. 2, 1992, now abandoned; which is a continuation of application Ser. No. 07/648,456 filed Jan. 30, 1991, now U.S. Pat. No. 5,174,640.

FIELD OF THE INVENTION

The invention relates to a thermal insulation box having an expanded thermal insulation material filling the space formed in between the outer and the inner boxes constituting said thermal insulation box, in particular to such thermal insulation box having a plurality of storage chambers therein.

BACKGROUND OF THE INVENTION

Refrigerators for professional use, e.g. one used in restaurant kitchens, have a plurality of storing chambers for storing various kinds of foods and drinks. In order to provide such a refrigerator the opening of the refrigerator must have a plurality of thermally insulating partitions and doors for the chambers.

A prior art refrigerator, as disclosed in Japanese Utility Model Early Publication NO. 60-5785, has a partitioning member which comprises a U-shaped front panel, a U-shaped cover mounted on the front panel to cover the rear end of said front panel, and an insulation material filling the space formed in said front panel.

The prior art partitioning member as described in the specification and shown in FIG. 2 in Japanese Utility Model Early Publication No. 60-5785, however, has several disadvantages. Firstly, the partitioning member of the refrigerator must be assembled from many components in many steps. Namely, it consists of the front panel, an insulation material, and the cover, with said insulation material being expanded after it is filled in between the front panel and the cover, and the partitioning member is secured at the opening of the refrigerator with screws.

Secondly, in assembling the partitioning member it is not easy to intimately combine the thermal insulator of the partitioning member with the thermal insulator in the wall of the refrigerator, so that their thermal insulation may not be homogeneous from place to place in the refrigerator, thereby resulting in regional water condensation.

Further, when a portion of the refrigerator is used as a freezer, condensed water if deposited on the partitioning member abutting the door freezes, making it difficult to open the door.

Still further, since the wall of the partitioning member and the thermal insulator are in loose contact, the strength of the partitioning member, and hence that of the opening of the refrigerator, is often insufficient. Consequently, it is necessarily to use a thick or strong material to strengthen the walls of the partitioning member.

In most cases such a conventional thermal insulation box is made by filling a thermal insulation material in the hollow space formed in between an inner and an outer box, the outer box usually made of stainless steel plates, and the inner boxes made of thin steel plates, as shown in FIG. 20.

Referring to FIG. 20, a prior art technique for making such inner box of thin steel plate is explained. An inner box comprises three parts, i.e. ceiling panels 90a, 90b, a left and right side panels 91 and 92, respectively, rear panels 93a and 93b, and a bottom panel 94, forming five sides of the box. Since refrigerators for domestic use are smaller in height and width than commercial steel plates, partitioning members may be made without difficulty with these commercially available METAL sheets. However, since refrigerators for business use, such as shown in FIG. 3, have inner boxes larger than the commercially available sheets, use must be made of several sheets for back panels 93a and 93b as shown in FIG. 20.

These plates are secured with screws or stitched together, as shown in FIG. 20. They may be alternatively caulked together as shown in Japanese Utility Model Early Publication No. 44-5415, which teaches caulking of back panels and side panels of the inner box. In any case, use of such panels is not only costly but also requires many assembling steps. Furthermore, since it is difficult to clean the rectangular corners of such inner box, it is preferable to make the corners round. However, fabricating round corners of such panels requires further costly processes.

Japanese Utility Model Early Publication No. 44-5415 teaches injection of urethane as an expandable thermal insulator into a suitable portion of the space between an inner and an outer boxes. In this prior art, although the urethane diffuses to most of the hollow space along the side panels and the rear panel, it might not completely fill up the space behind protruding flange portions connecting adjacent plates, since the flow of urethane is blocked by the protruding flanges.

BRIEF DESCRIPTION OF THE INVENTION

The invention is directed to overcome the above mentioned disadvantages in the prior art. Therefore, a primary object of the invention is to provide a thermal insulation box having an integral insulator extending in the partitioning member and the insulation box.

A second object of the invention is to provide an improved thermal insulation box which may be manufactured at low material cost and require only a small number of assembling processes including injection of an insulator.

In order to attain these objects, a thermal insulation box according to this invention has an inner and outer boxes forming a space in between said boxes, and a partitioning member provided at the opening of the thermal insulation box for partitioning the opening of the box, which thermal insulation box is characterized in that:

the partitioning member has an outer shell forming therein a space which communicates with said space formed in between said inner and outer boxes; and that the space formed in between the inner and the outer boxes and inside the partitioning member are filled integrally with a thermal insulation material.

Since the partitioning member having an outer shell has a hollow space therein which communicates with the space formed in between the outer and inner boxes of the thermal insulation box, the partitioning member may lead the expandable thermal insulation material injected into the latter space like a hollow pipe. Thus, the injected thermal insulator will fill both spaces uniformly and form an integral insulator, giving uniform thermal insulation throughout the whole box.

Since the insulator filling the space between the inner and the outer boxes of the thermal insulation box is integral with the insulators filling the hollow space of the partitioning member, as mentioned above, the strength of the thermal insulation box is enhanced. A process of manufacturing them is simple, too: It requires only injection of expandable insulation material into the spaces.

Also, an inner box for use with a thermal insulation box in accordance with the invention has an inner and outer boxes which form a space in between said outer and inner boxes, and is characterized in that said inner box comprises a main body which is made up of: a metal plate having, along opposite longitudinal ends thereof, flanges having V-shaped transverse cross sections and having a pair of cuts on each flange; and a metal plate having along one end thereof a V-shaped transverse cross section and a flat flange on another end thereof and having a pair of V-shaped cuts on each flange. Each of the metal plates is folded into a U-shaped panel along the transverse lines connecting said cuts in the opposite flanges. The U-shaped panels are combined by inserting said flat flange into the V-shaped groove of said V-shaped flange of another panel and caulked to thereby forming an air tight seal between the flanges in contact. A ceiling panel and a bottom panel are inserted in the remaining V-shaped grooves of said main body. The flanges receiving said ceiling and bottom panels are then caulked.

Since this main body may be constructed by deforming two elongate metal plates into U-shaped panels and combining them together along their flanges, no further fabrication of side panels is required as in the prior art, which may save manufacturing materials, cost, and processes. Furthermore, the corners of the main body may easily be made round, which is favorable for cleaning the box. The round corners are also favorable in providing smooth flow of the expandable insulation material injected into the hollow spaces.

DETAILED DESCRIPTION OF THE PREFERRED EMBODIMENT

Figure 1:
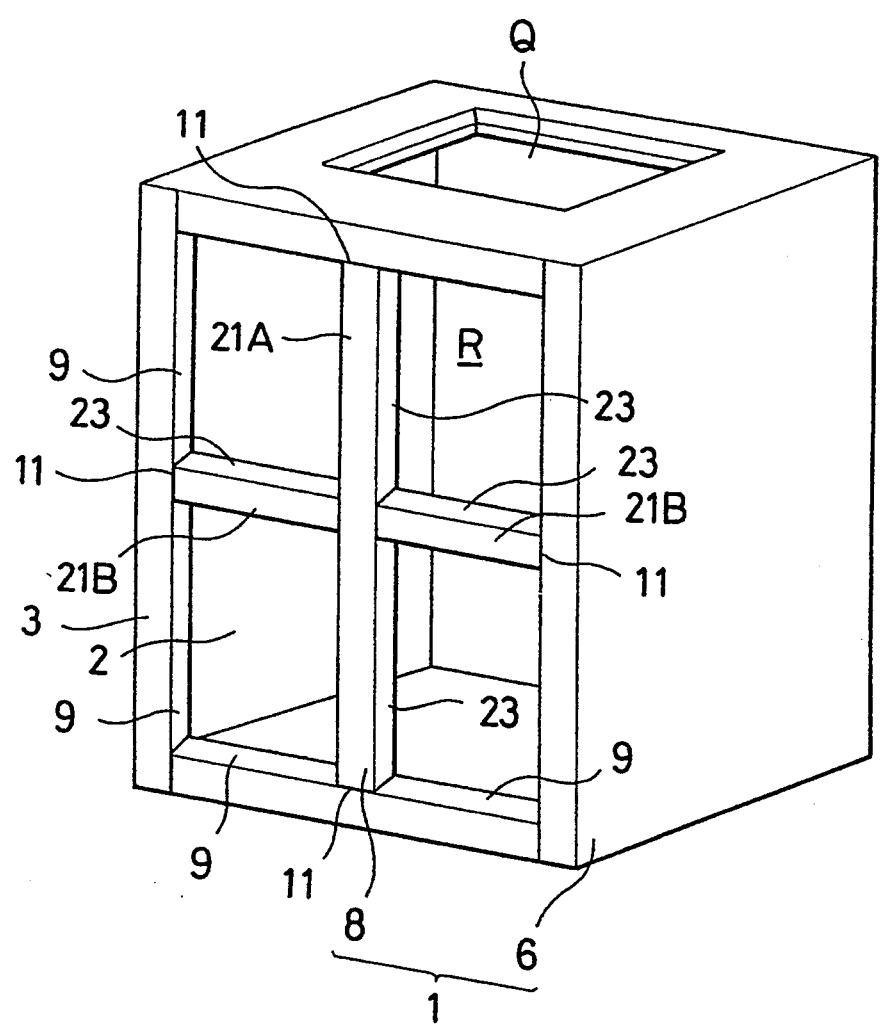
FIG. 1 is a perspective view of a thermal insulation box embodying the invention.
Figure 2:
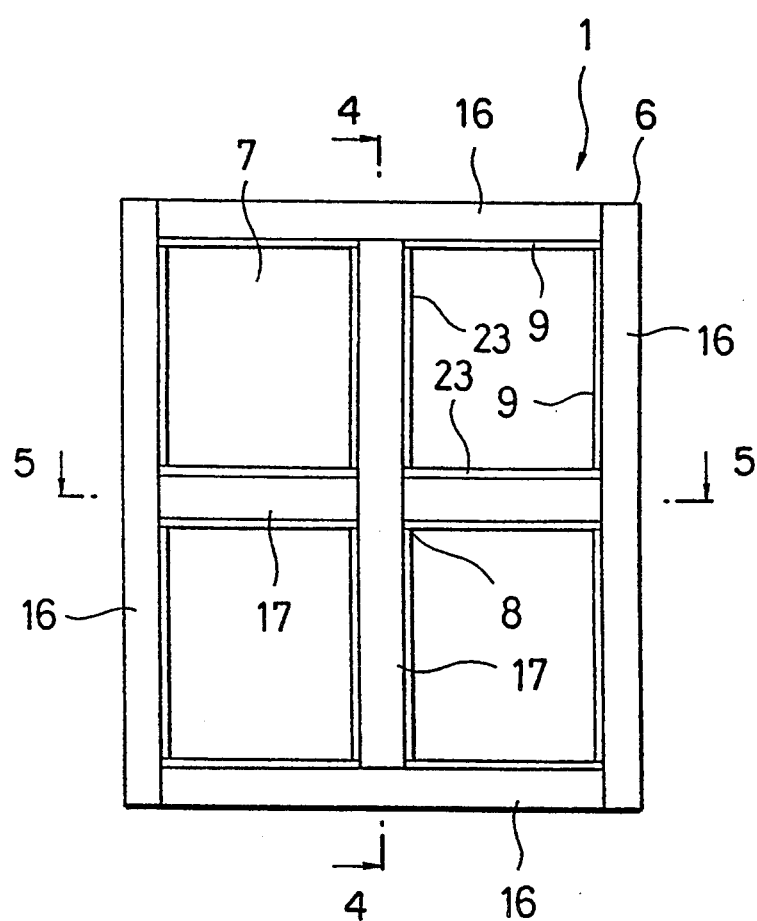
FIG. 2 is a cross sectional view of the thermal insulation box of FIG. 1.

Referring now to the accompanying drawings a first embodiment of the invention is described below.

A thermal insulation box 1 comprises a thermal insulation chamber portion 6 and a partitioning member 8 for partitioning into several thermally insulated partitions the opening 7 of the chamber portion 6. The chamber portion 6 consists of an outer box 3, an inner box 2 which is made of an corrosion-resitive material, for example stainless steel, and a thermal insulator 5 which is formed by injecting an expandable thermal insulation material 5 into the hollow space 4 formed in between the inner and the outer box. The opening 7 is provided for replenishing goods, and is formed in this example in the front end of the chamber portion 6.

The thermal insulation partitioning member 8 has a hollow space 12 surrounded with outer shells 13 (FIG. 12) having open ends 11. The hollow space 12 may thus communicate with the hollow space 4 in the neighborhood of the opening 7, so that the insulator 5 filling the hollow space 4 and the insulator 15 filling the hollow space 12 may be formed integrally. In this example the partitioning member 8 is in a shape of a cross, partitioning the opening 7 into four division. An opening Q is provided for receiving therein a refrigeration unit for refrigerating the storage chamber R.

Figure 3:
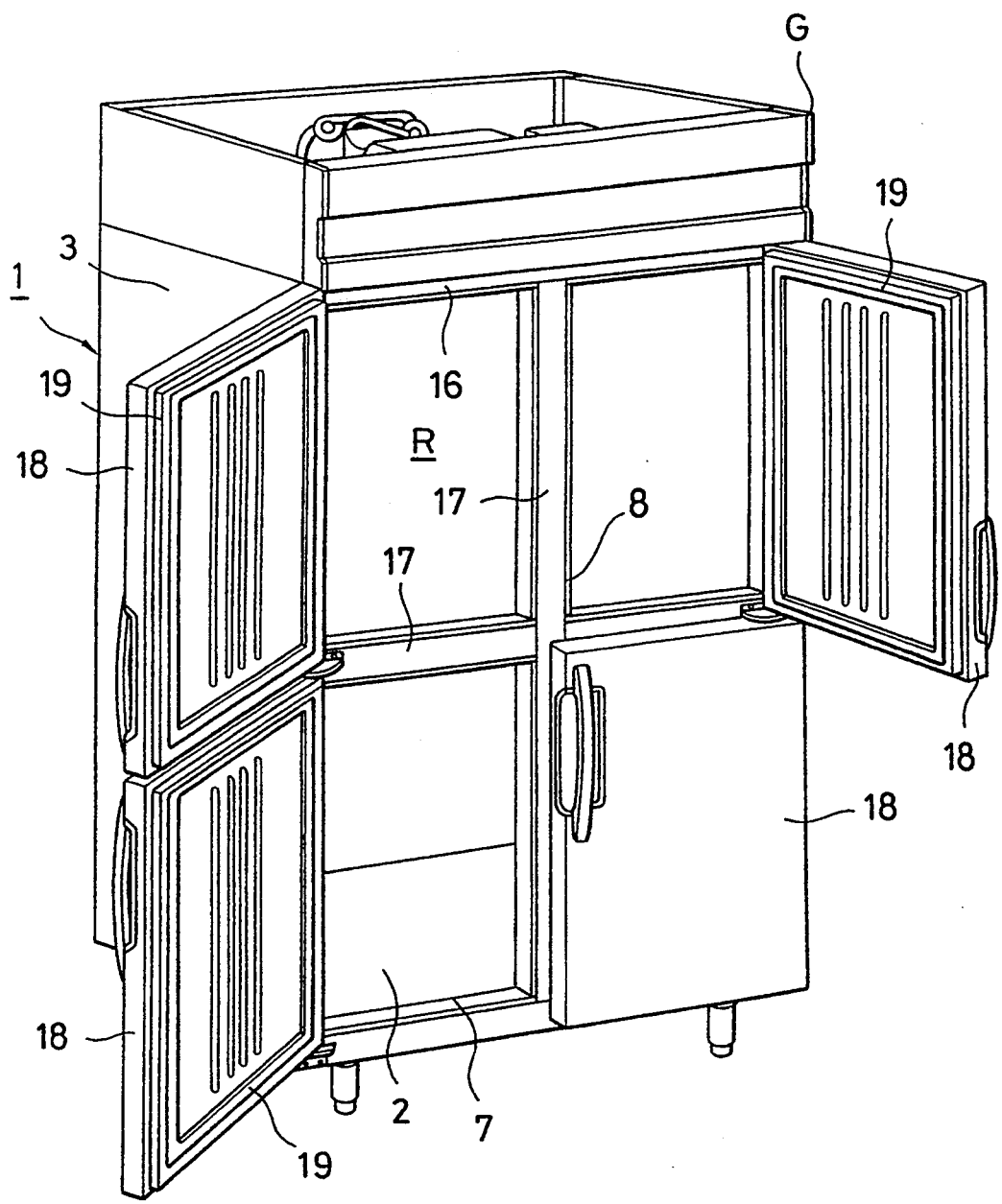
FIG. 3 is a schematic perspective view of a thermal insulation box of the invention for business use.
Figure 4:
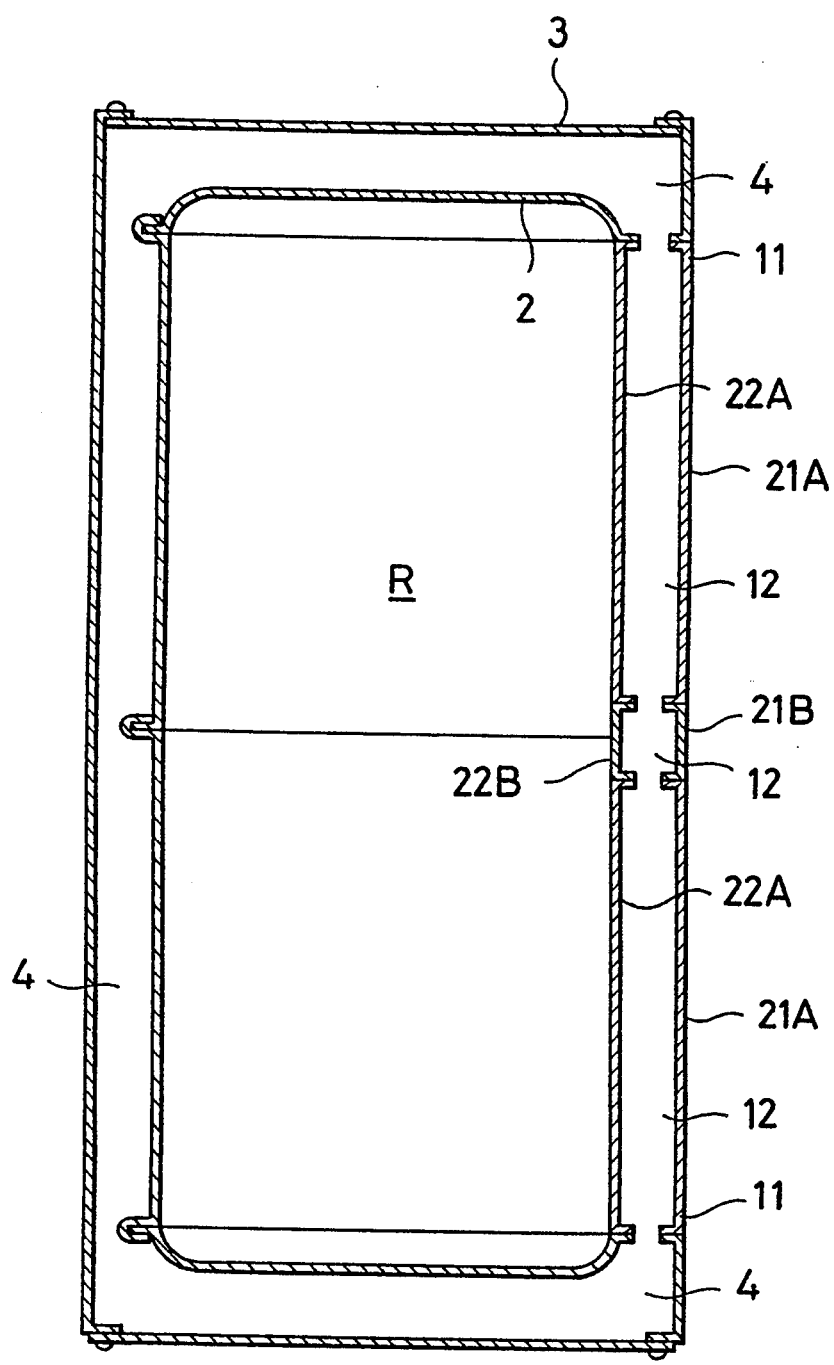
FIG. 4 is a cross sectional view of the thermal insulation box taken along the line A—A of FIG. 2 before insulation material is injected into the box.
Figure 5:
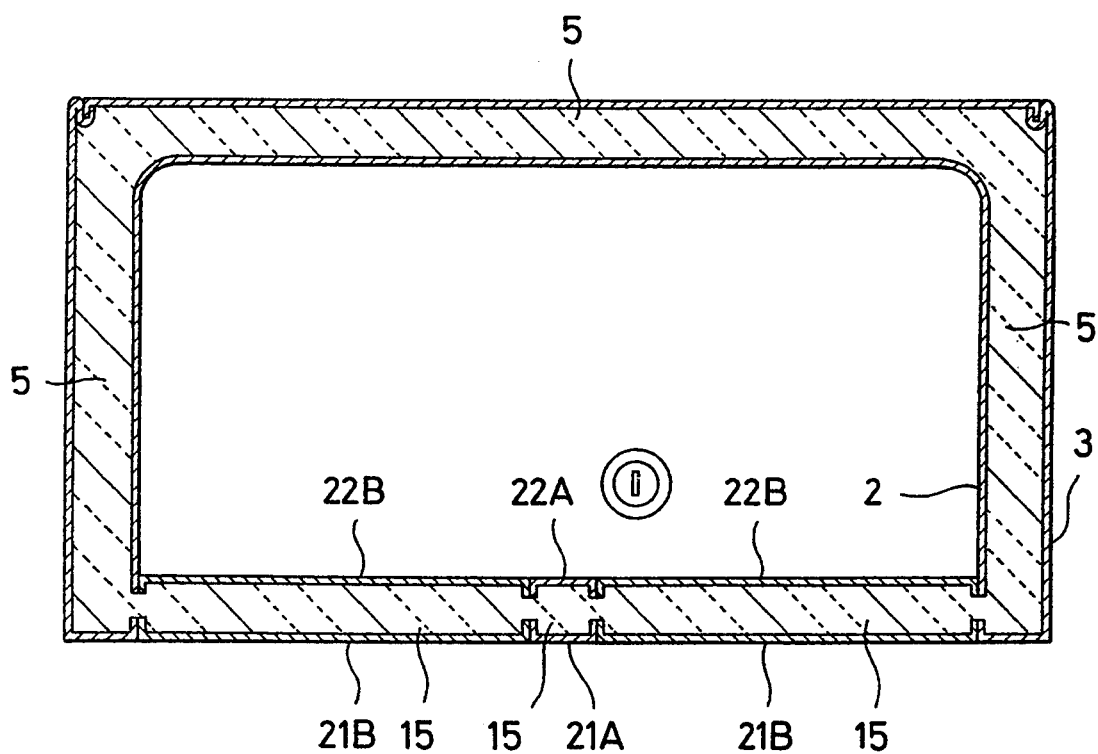
FIG. 5 is a cross sectional view taken along the line B—B of FIG. 2 after the insulation material is injected.

A chamber portion 6 of a thermal insulation box for business use, as shown in FIG. 3 has an opening 7 whose front surface 16 is flush with the front surface 17 of the thermal partitioning member 8, and a thermal insulation door 18. The packing 19 provided along and inside the door 18 abuts on the fringes of the front surfaces 16 and 17, to thereby form a seal as the door is closed and form a closed space for the storage chamber R. The chamber is partitioned into smaller communicating sections.

Figure 7:
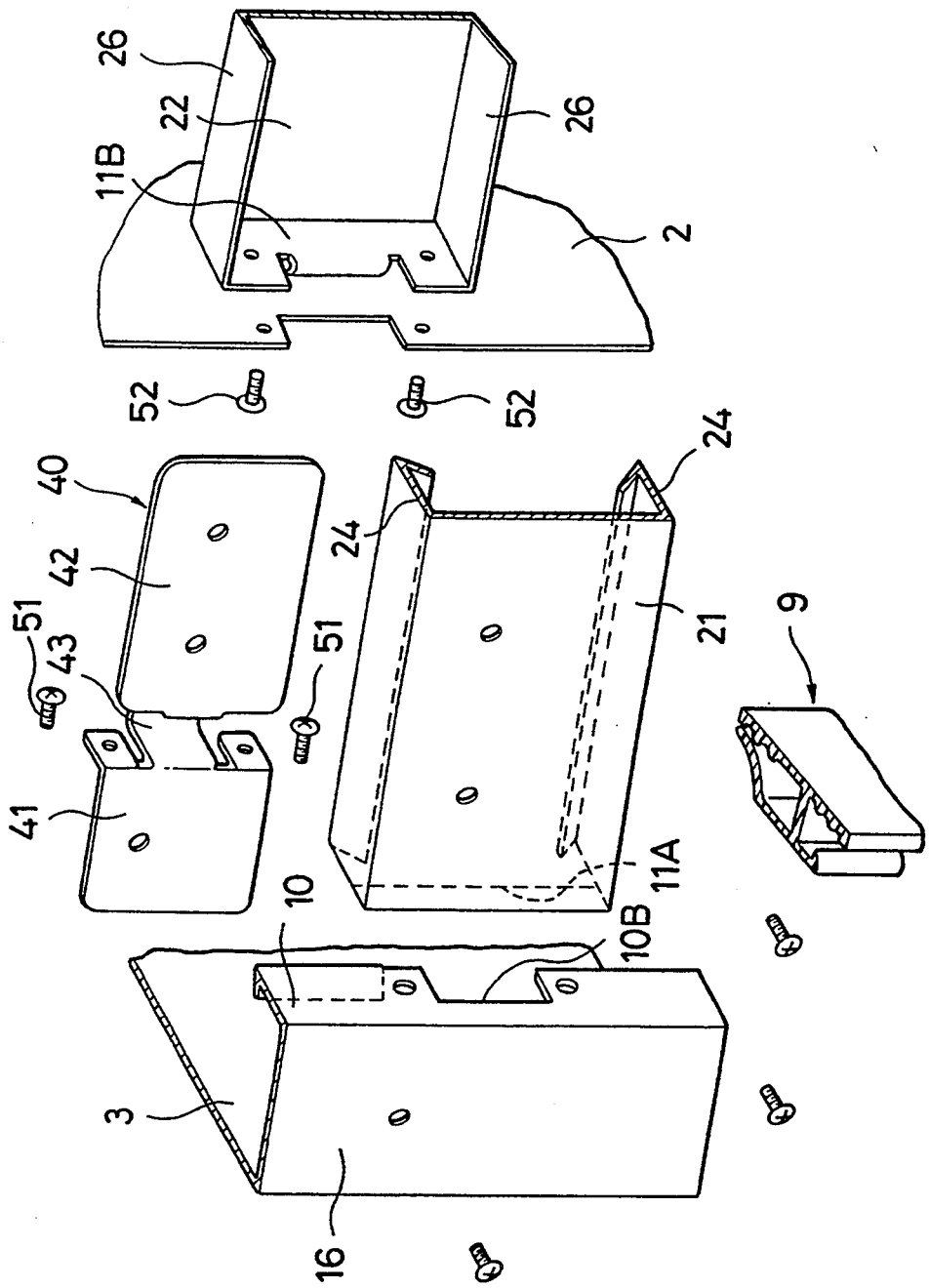
FIGS. 7 and 8 are perspective views of the thermal insulation box, illustrating a corner where the inner and outer boxes meet a partitioning member.
Figure 8:
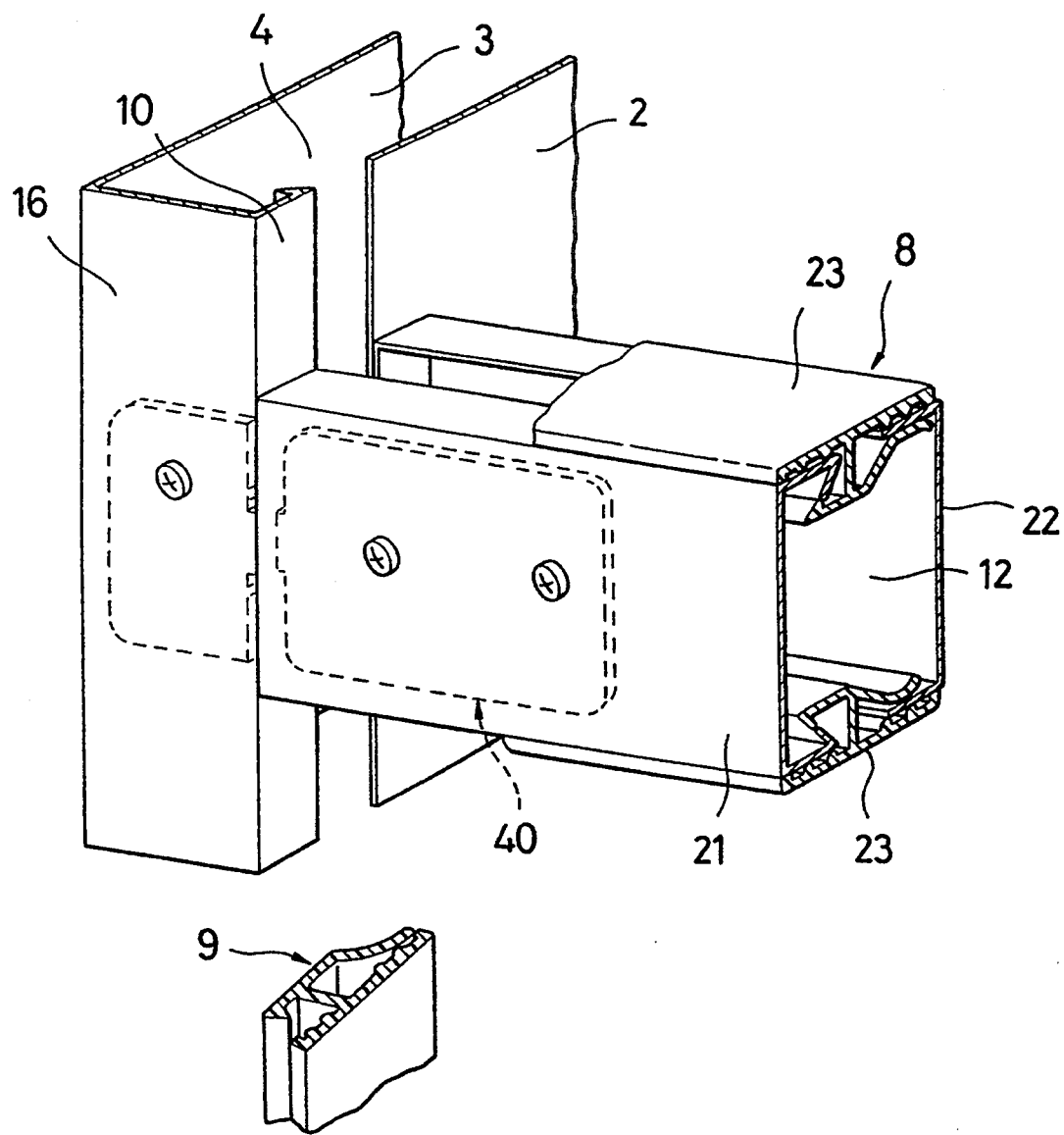
Figure 9:
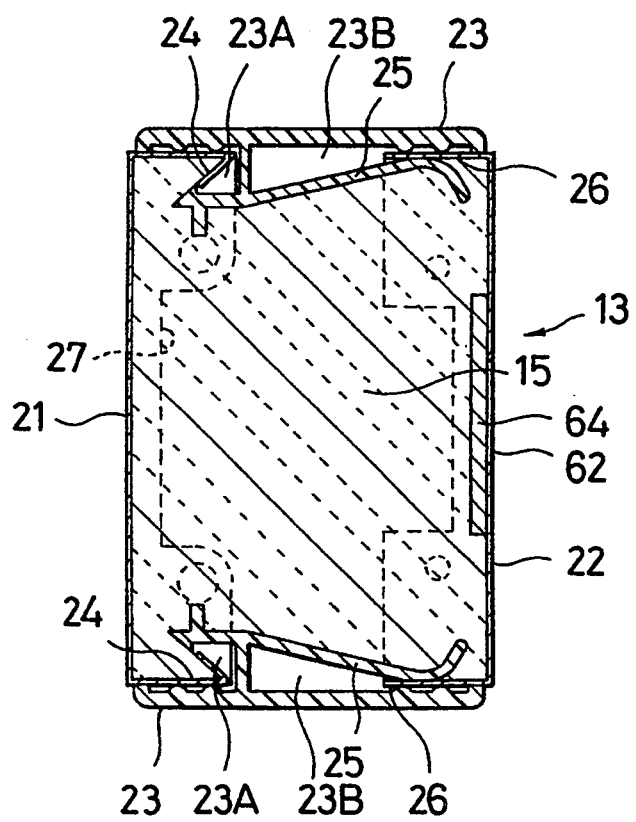
FIGS. 9 and 10 are a cross section and a perspective view, respectively, of the thermal insulation box, illustrating a portion of a gas outlet provided in an outer shell.
Figure 10:
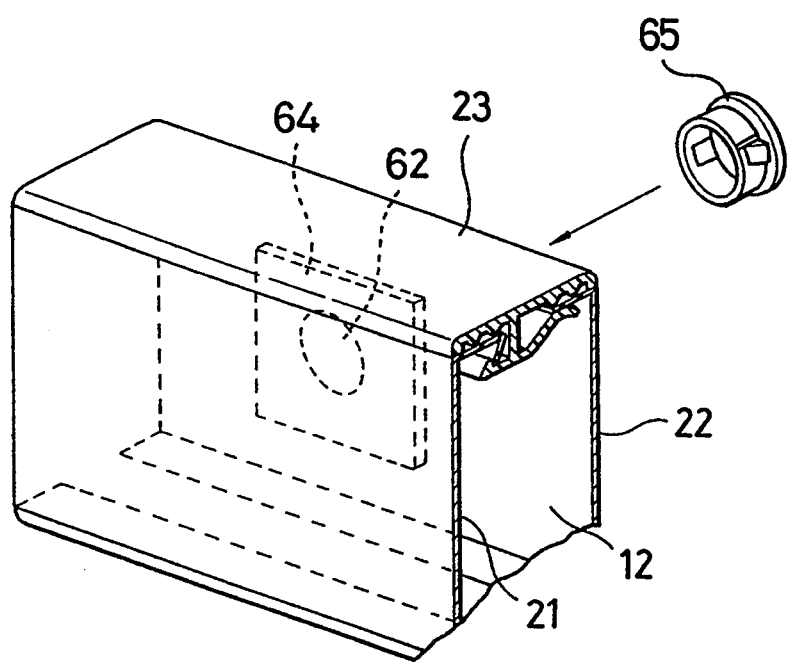
Figure 11:
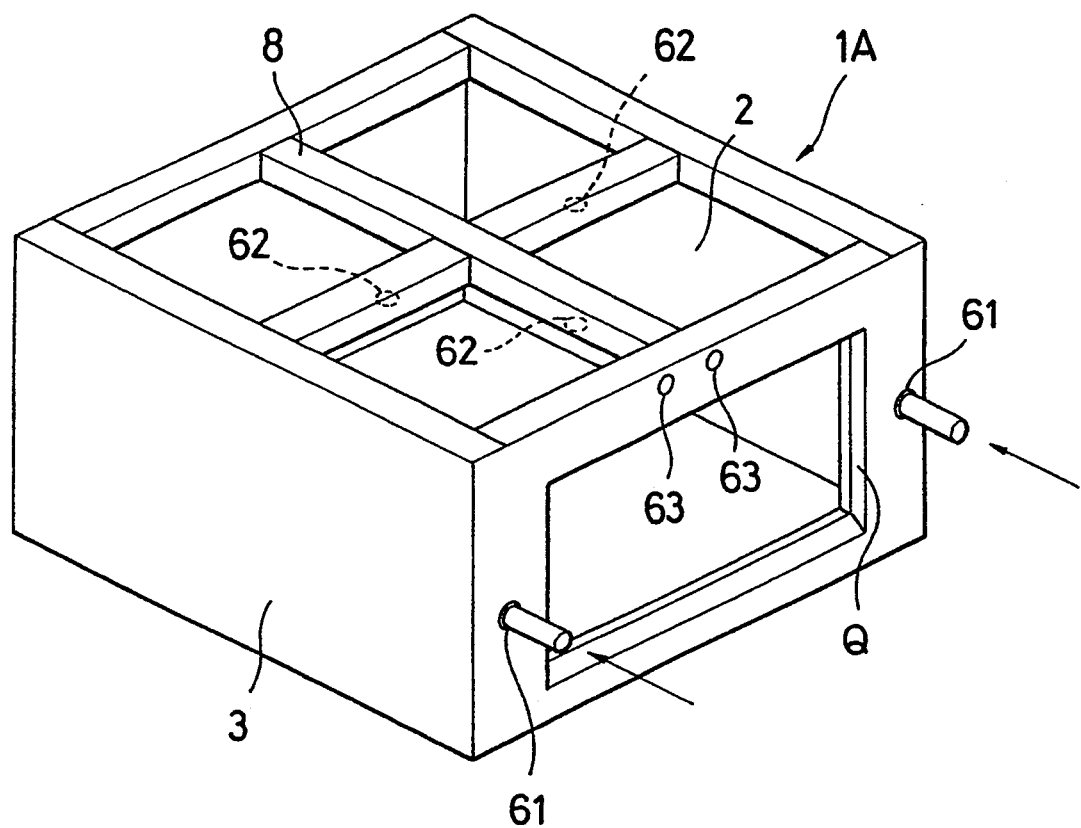
FIGS. 11 and 12 are perspective views of the thermal insulation box, with an expandable insulation material injected into the hollow space of the box.

The outer shells 13 of the thermal insulation partitioning member 8 each have a cross section as shown in FIG. 9. The shells are assembled with a front metal panel 21 forming a front surface 17 of the partitioning member 8, a rear metal panel 22 for forming the rear surface of the partitioning member 8 and upper and lower plastic style strip 23, forming a hollow space 12 therein. The style strip 23 has a set of first recesses 23A for receiving flanges 24 extending from the sides of the front panel 21, and a second set of recesses 23B for receiving the flanges 26 extending from the sides of the rear panel 22. The second recesses 23B have resilient flaps 25 for securely pinching the flanges 26 that are received therein. As shown in FIGS. 7, 8 and 11, the edges of the inner box and the flanges 10 of the outer box 3 are combined with style strips 9 which have the same cross section as the style strips 23.

Figure 6:
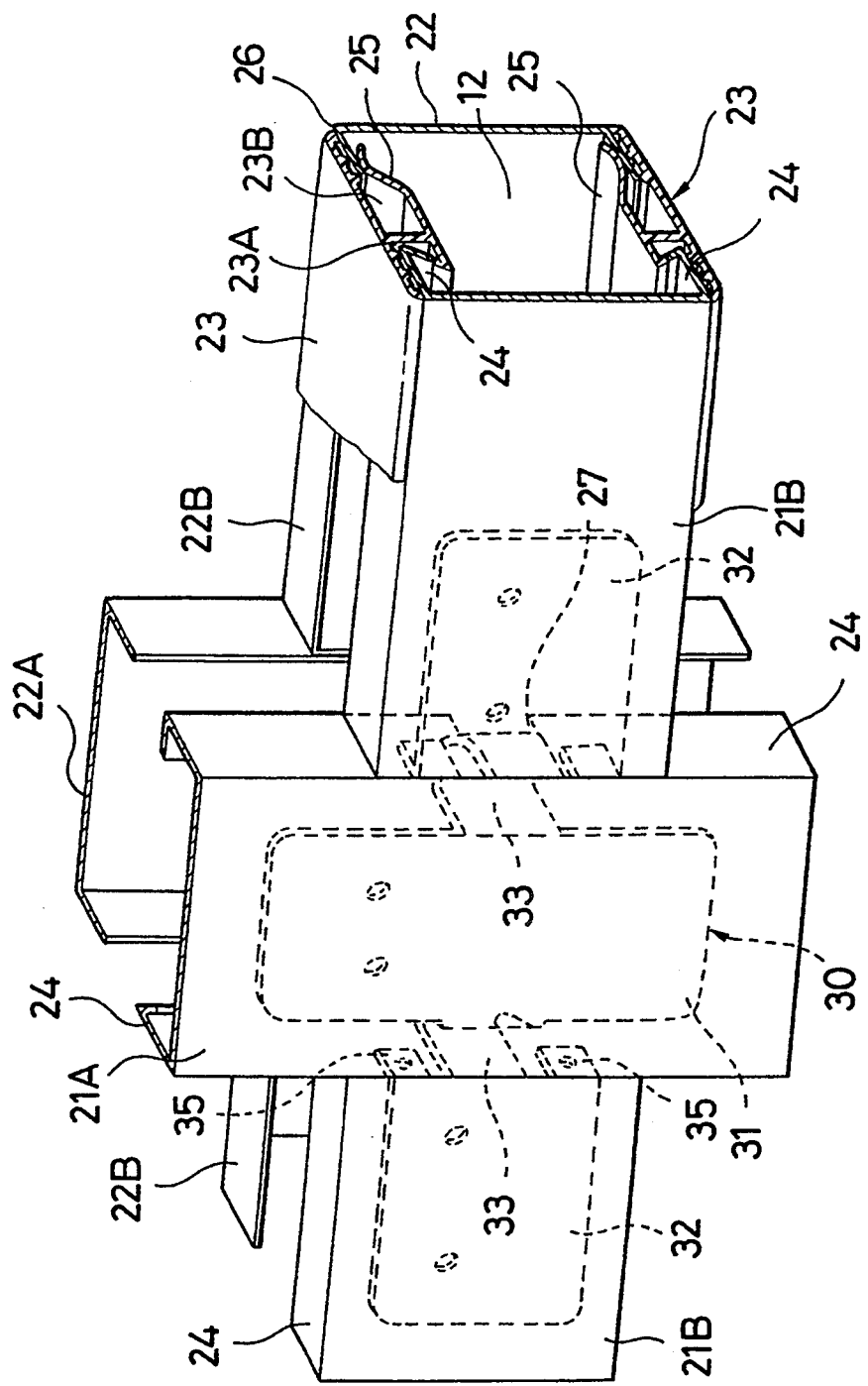
FIG. 6 is a perspective view of the thermal insulation box, illustrating a corner where vertical and horizontal portions of a partitioning member meet.

As shown in FIG. 6, the cross shaped intersecting portion of the partitioning member 8 is formed of a vertical front plate 21A and a transverse front plate 21B which are connected by means of a connection member 30, and of a vertical rear plate 22 A and a transverse rear plate 22B which are connected with screws. These plates are further combined with the style strips 23 by means of the flanges 24 and 26 of the front and the rear plates, forming a crossing hollow space.

The connection member 30 has a base 31, two holding ears 32, and insertion lips 33 for connecting the base 31 with the holding ears 32 and for receiving inserted flanges 24 of the vertical and transverse front panels 21A and 21B, respectively. The flanges 24 have cuts 27 for avoiding abutment on the portions 33 when the flanges are inserted in the insertion lips. The holding ears 32 have securing portions 35 on which flanges 24 are connected with a securing means such as screws.

On the other hand, all the connecting portions of the insulation chamber 6 and the corresponding portions of the partitioning member 8 are connected by means of connection members 40 as shown in FIGS. 7 and 8 and securing means such as screws so that the flanges 10 of the outer box 3 are combined with the end portion 11A of the front plates 21 and the peripheral edges of the inner box 2 with the end portions 11B of the rear plates 22. The connection member 40 comprises a first abutment portion 41 that abuts on the inner surface of the front plate 16 of the outer box, a second abutment portion 42 that abuts on the inner surface of the front plate 21, and an insertion portion 11A that connects the abutment portions 41 and 42 and holds an inserted flange 10 of the outer box 3 as well as the inserted end portion 11A of the front plate 21. The outer box 3 have cuts 10B for avoiding abutment on the insertion portion 43.

Connections between the inner and outer boxes 2 and 3, respectively, and a process of assembling the outer shells 13 are now described.

Firstly, connection members 40 are secured on the flanges 10 of the outer box 3 with screws 51, with the front sides of the insertion portions 43 oriented outwardly. The vertical and transverse rear plates 22A and 22B, respectively, are connected in a cross. The four corners 11B of the rear plates forming the cross are then secured with screws 52 on the open ends of of the inner box 2. The inner box 2 is then inserted into the outer box 3 from the bottom side.

On the other hand, the vertical and transverse front plates 21A and 21B, respectively, are connected in a cross by means of connection member 30. Each style strip 23 is mounted so that the associated flange 24 is received in the first recess 23A of the style strip 23.

The flanges 26 of the rear plates 22 are inserted into the second recesses 23B of the style strips 23 and the front plates 21, and, assembled in a cross, mounted on the style plates. The four corners 11A of the cross front plates are inserted into the insertion portion 43 of the connection members 40.

The bottom wall of the outer box is then secured. The style strips 9 are then mounted over the ends of the inner and outer box.

The inner and outer boxes and the outer shells 13 thus connected has a form of box 1A having a single hollow space formed therein.

Figure 12:
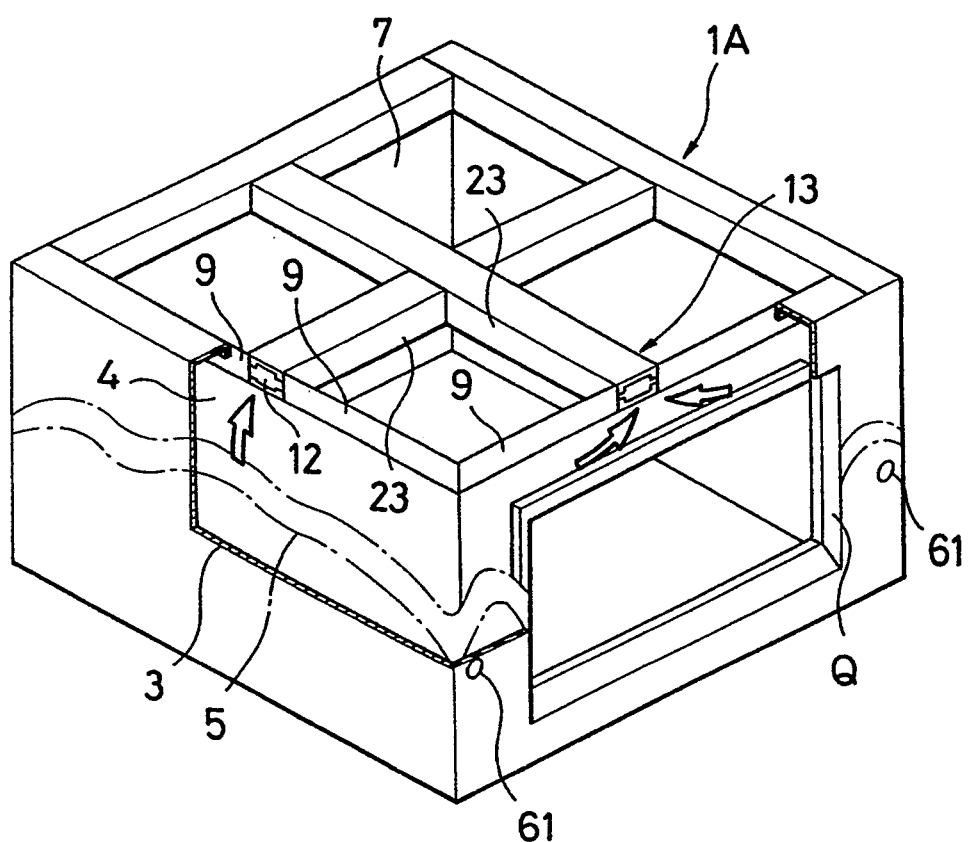

Referring now to FIGS. 11 and 12, a so-called SF process of injecting an expandable insulating material 5 into the box 1A is now described. (For details see Japanese Patent Early Publication No. 61-35462.)

First, the box 1A is fastened on a heated expansion jig (not shown) which is maintained at a predetermined temperature with its opening 7 oriented upward.

A given amount of liquid-state expandable insulation material is injected into an injection mouth 61 formed in the ceiling wall of the box 1A. The injected liquid begins to expand as it reaches the rear portion of the heated bottom wall (which is positioned low in this case) of the box 1A and grows upwardly, forming an insulator through the hollow space 4 that fills the space. As the expanded insulator reaches the opening 7, it also fills the hollow space 12 communicating the space 4. In this case the gas liberated from the growing insulator and the air in the hollow space 12 are expelled from the outlet 62 formed in an appropriated position of the rear plate 22 of the partitioning member 8 and an outlet 63 formed through the ceiling wall. These outlet 62 and 63 are provided with air-permeable member 64 inside the outlets, which allow transport of air and gas while prohibiting leakage of the insulation material through the outlets. After the completion of the expansion, they are covered with lids 65. The outlet 62 may also serve as a window for conveniently checking if the insulation material 15 fills the hollow space 12 inside the outer shell 13.

After the expansion is finished, the box 1A is removed from the expansion jig, and utilized as a thermal insulation box 1 having a partitioning member 8.

Figure 13:
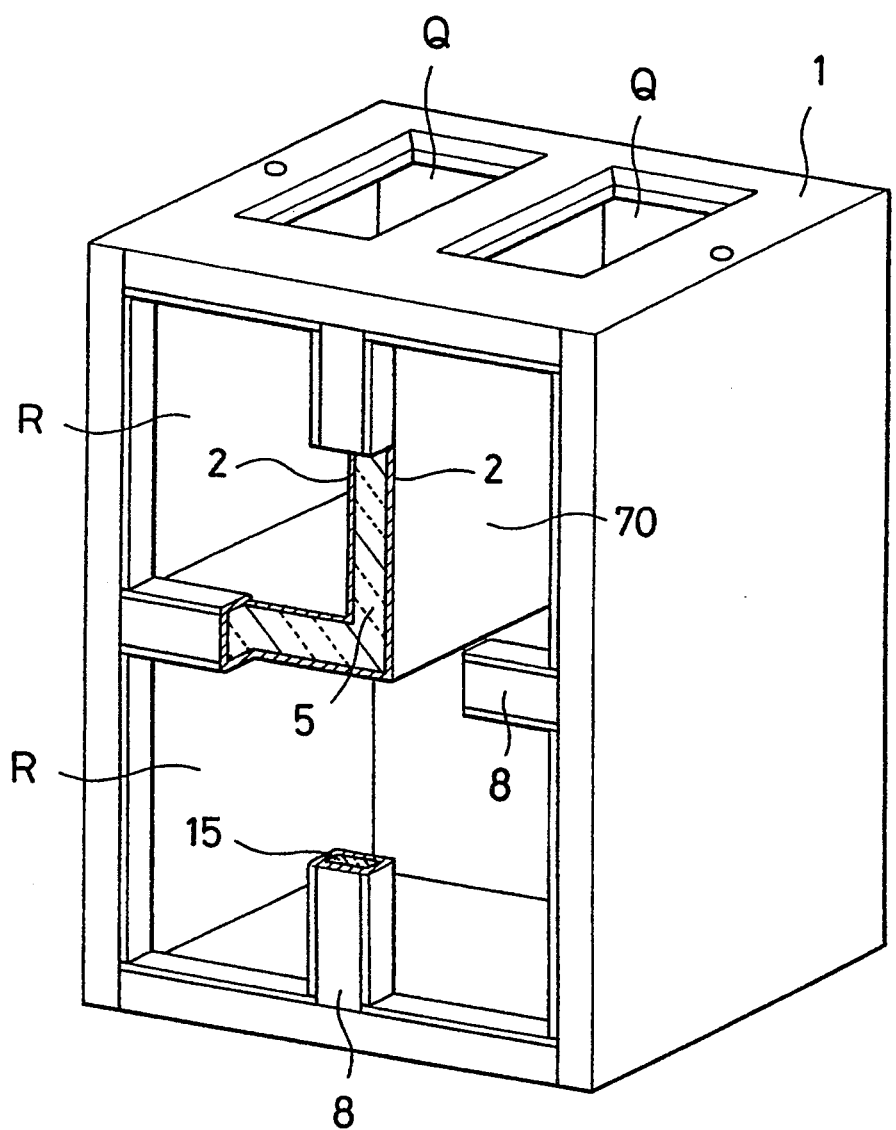
FIGS. 13 and 14 are perspective views of another thermal insulation box embodying the invention, partially cut away for illustration.
Figure 14:
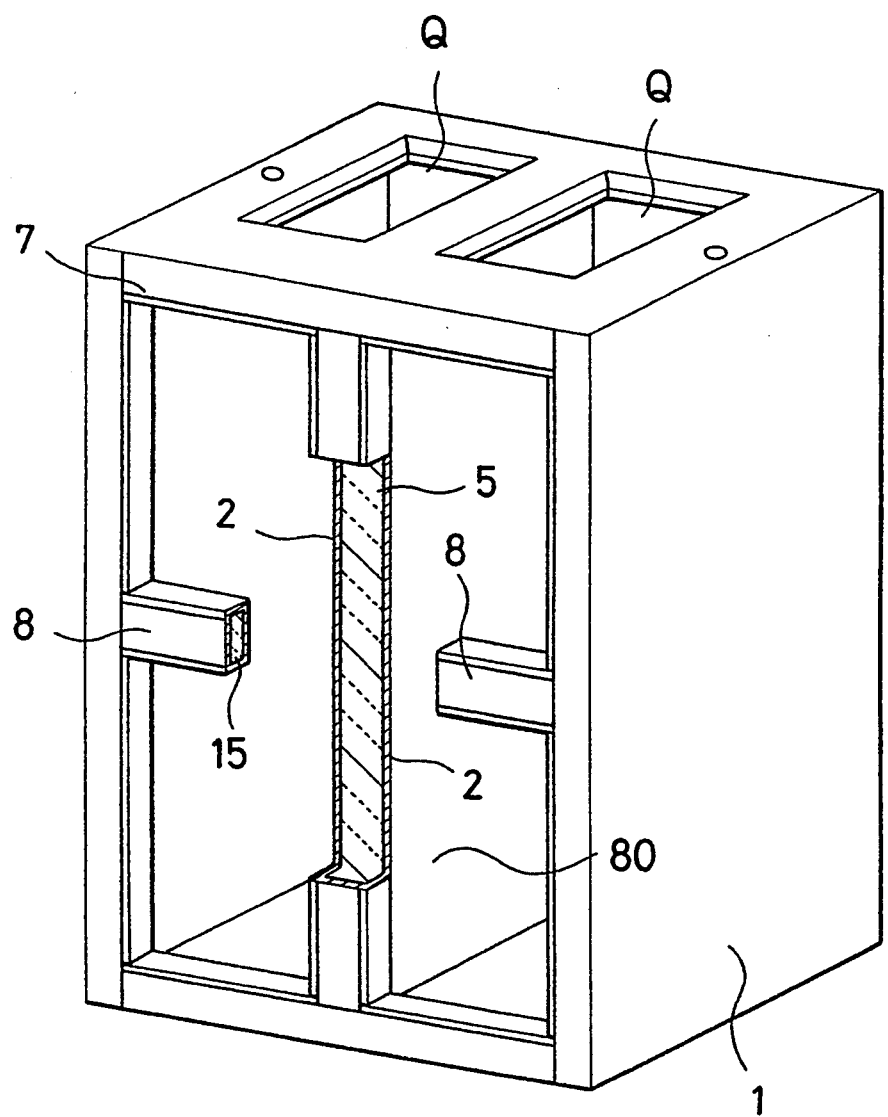

Although in the above example a box having a partitioning member 8 partitioning the opening of the storage chamber into four sections, the invention may be equally applied, as shown in FIG. 13, to a thermal insulation box wherein one storage chamber (the left upper one in this Figure), associated with one partition of the opening, is isolated by wall 70 from the rest of the chambers. This may be also applied to one as shown in FIG. 14 wherein the box is divided into right and left chambers by an insulation wall 80 arranged behind the vertical members of partitioning member 8. In these cases the insulators of the walls 70 and 80 are molded integrally with other insulators.

According to the invention as described above, the partitioning member 8 is covered with outer shells 13 surrounding the hollow space 12 therein, whose openings 7 communicate at the end portions 11 with the hollow space 4 formed between the inner and the outer boxes 2 and 3, respectively. The outer shells themselves serve as guiding pipes for introducing flow of the insulator into the hollow space 4 between the boxes 2 and 3 as well as into the hollow space 12 of the partitioning member 8. As a result the insulators in the thermal insulation chamber 6 and in the partitioning member 8 are structurally united and provide uniform thermal insulation for the thermal insulation box 1, preventing otherwise probable formation of dews on the partitioning member 8.

Since the insulator filling the hollow space 4 is formed integrally with the filling in hollow space 12, the strength of the thermal insulation box 1 is enhanced. The partitioning member 8 of such box may be easily constructed by simply injecting and expanding the insulation material into the hollow space 12. Furthermore, the partitioning member according to the invention has a nice outer appearance since no securing member for assembling the partitioning member 8 is seen.

Referring to FIG. 15 through 19, a second mode of the invention is now described.

Figure 15:
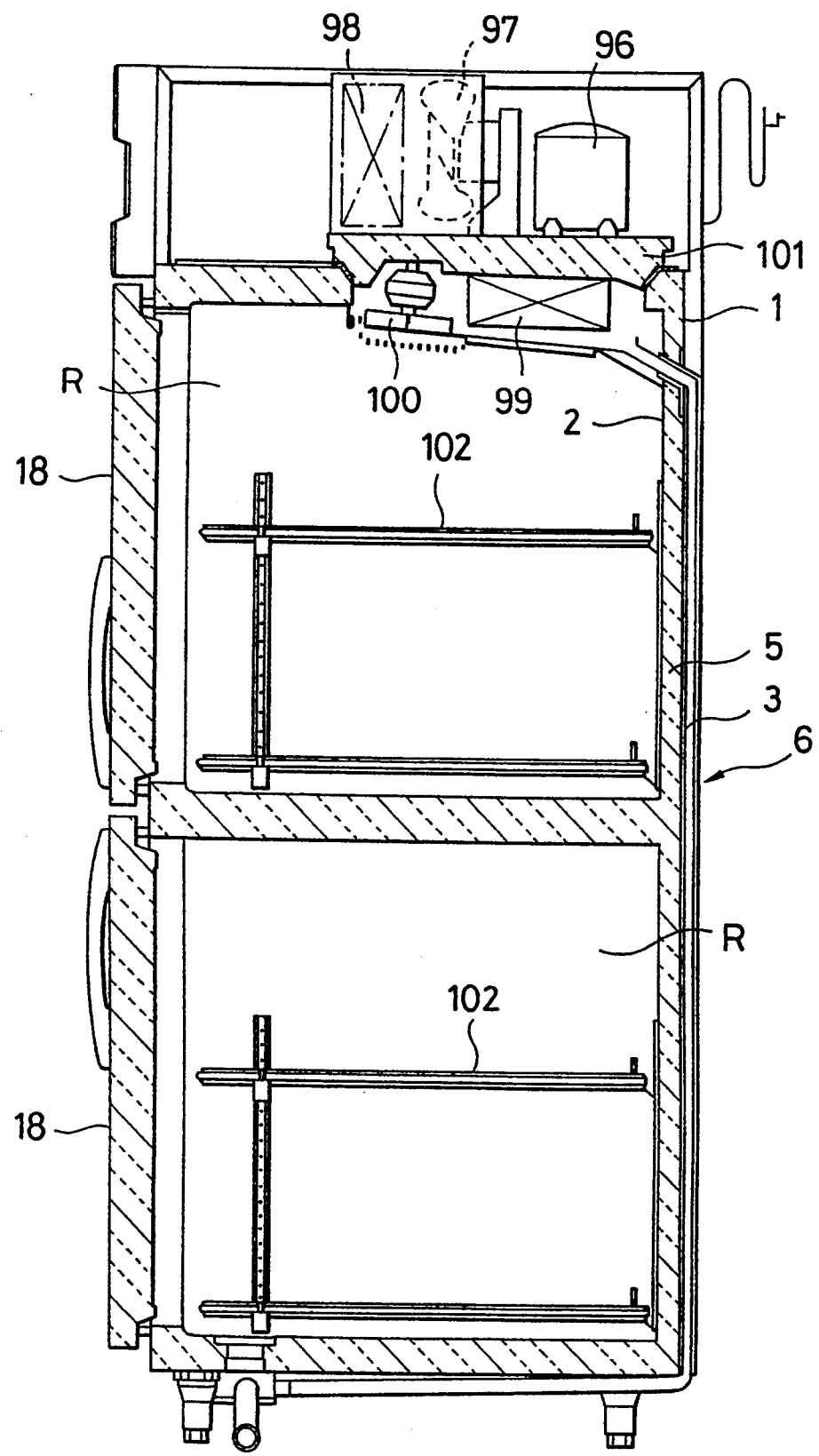
FIG. 15 is a sectional side elevation of a thermal insulation box of FIG. 3 for business use.

A refrigerator for business use as shown in FIG. 15 is provided with a thermal insulation chamber 6 having four storage sections as shown in FIG. 3, which has an expanded thermal insulator (e.g. urethane) between an inner box 2 and an outer box 3. The refrigerator has a refrigeration unit or compressor 98, an evaporator 99 on an upper lid 101, and a cold air circulation fan 100 mounted on the lid for circulating cold air through the insulation chamber R. Shelves 102 may be adjusted in height. Stored goods may be taken out from doors 18.

Figure 16A:
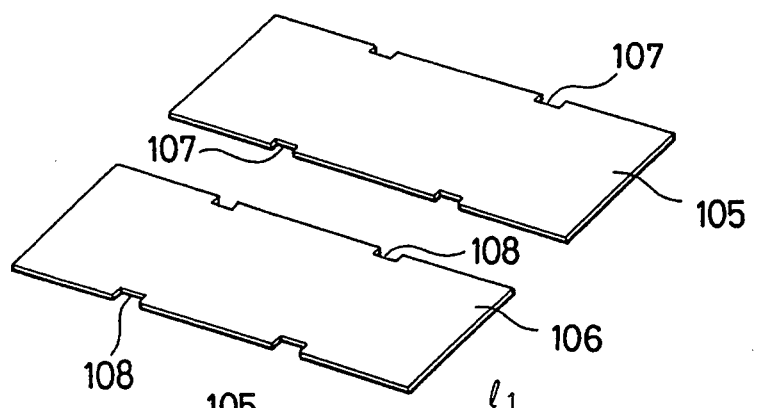
FIGS. 16a, 16b and 16c are views of a main body of an inner box, illustrating a process of assembling plates into the main body of the inner box.
Figure 16B:
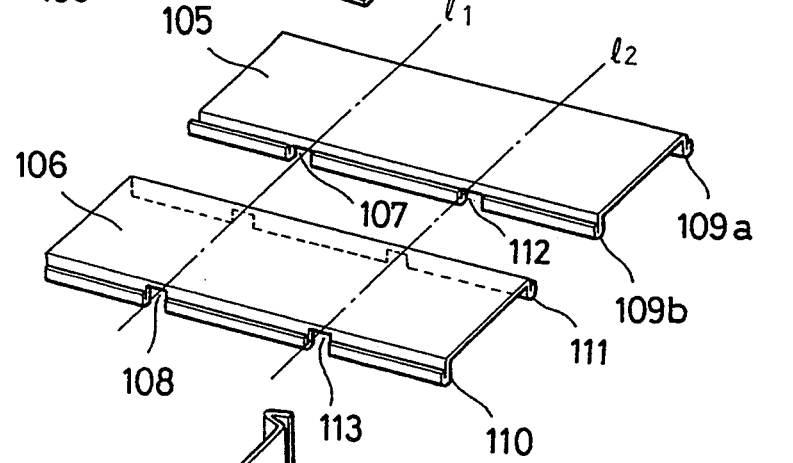
Figure 16C:
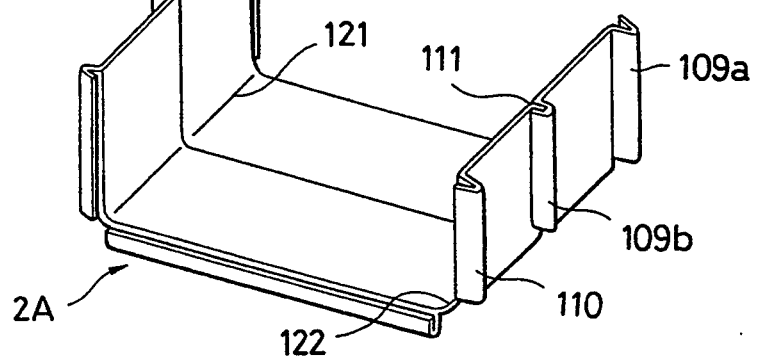
Figure 17:
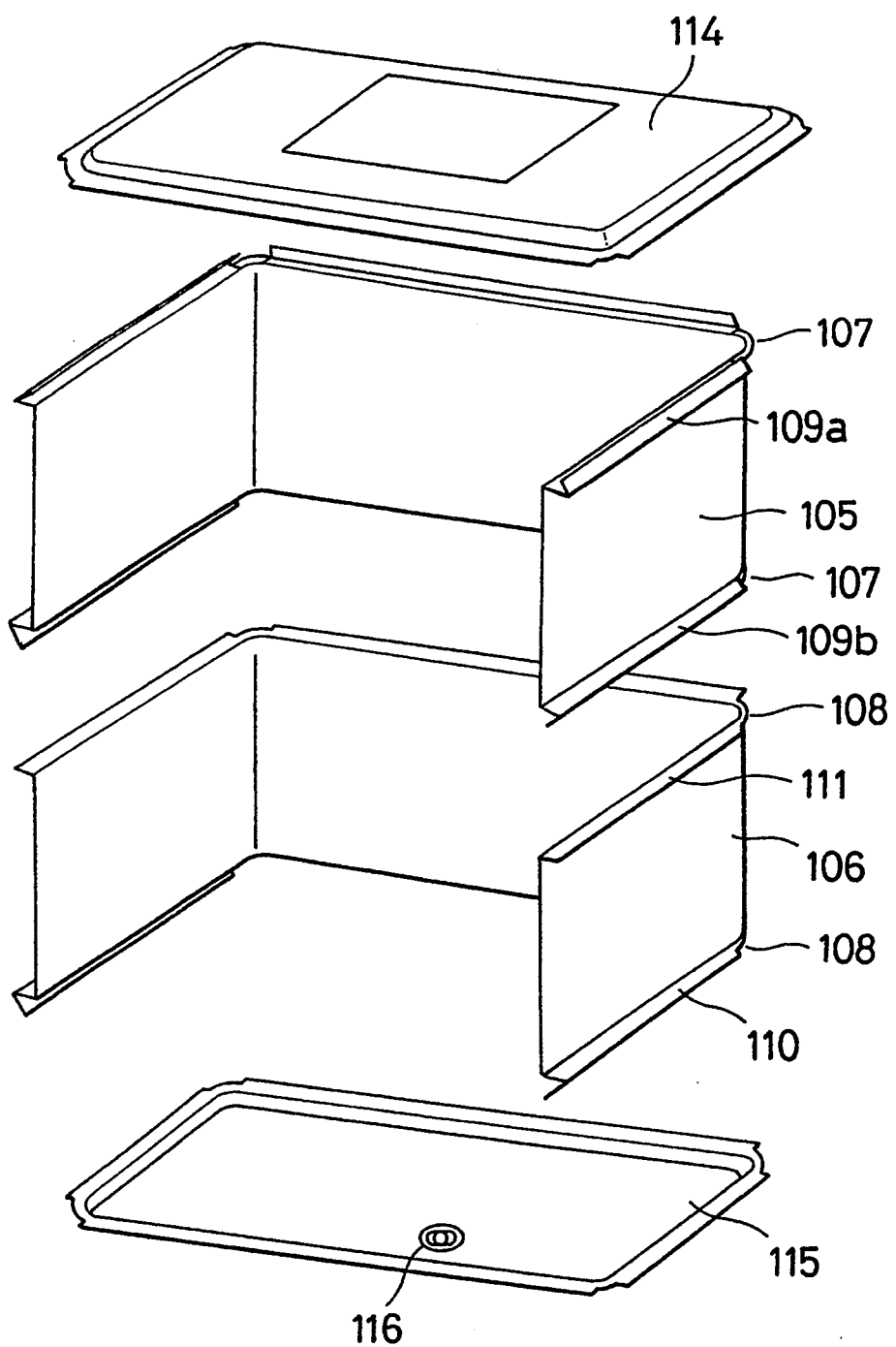
FIG. 17 is an exploded view of the inner box, illustrating how the inner box is assembled from the main body, a ceiling panel and a bottom panel therefor.
Figure 18:
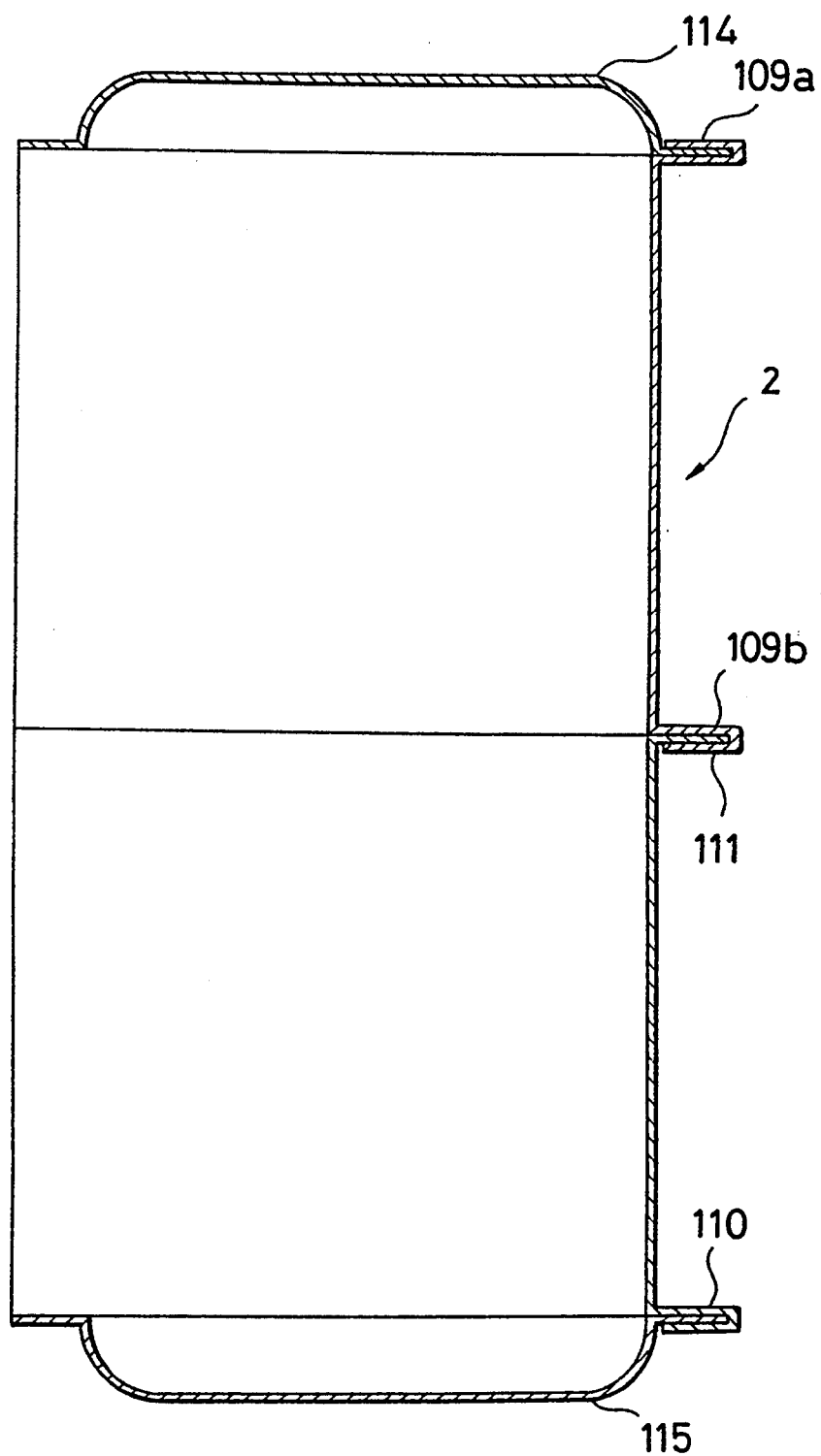
FIG. 18 is a sectional side elevation of the inner box.
Figure 19:
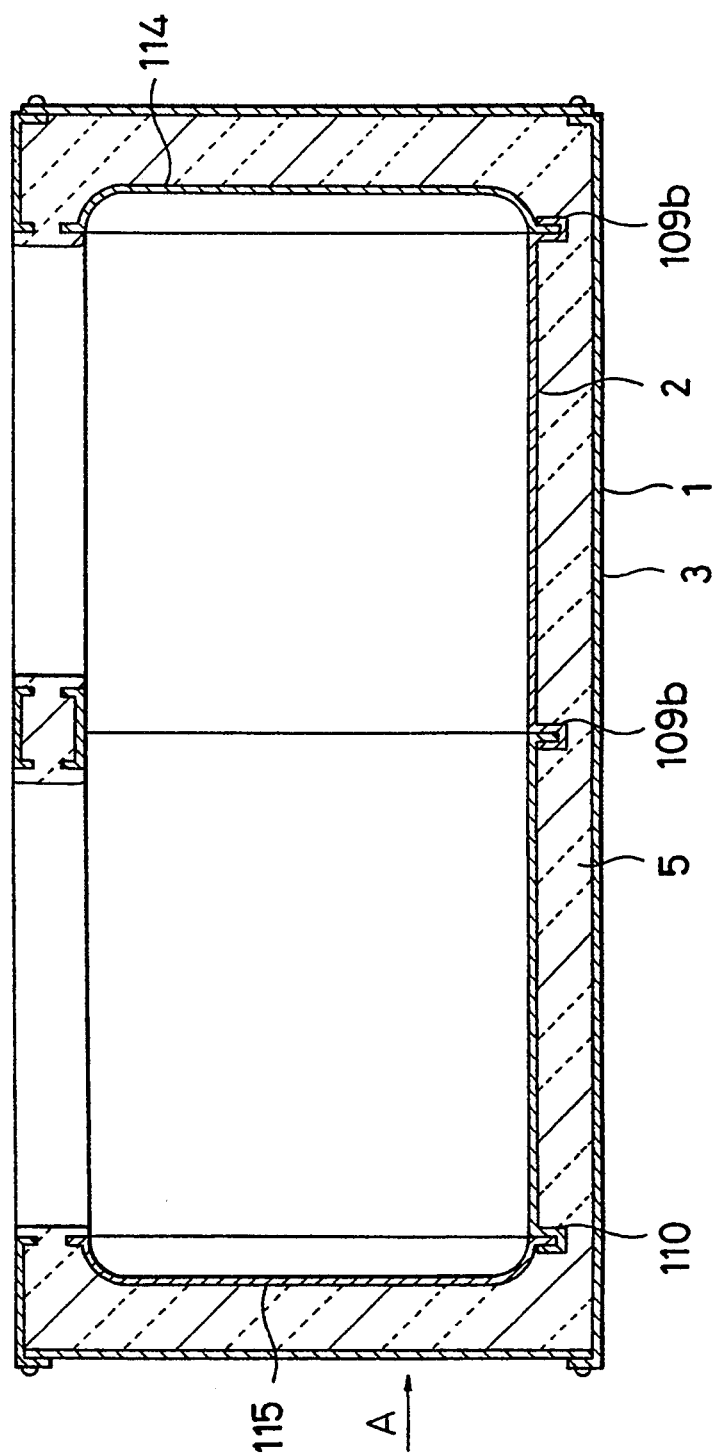
FIG. 19 is a cross sectional view of the body of a thermal insulation box comprising an outer box, an inner box and a thermal insulator.
Figure 20:
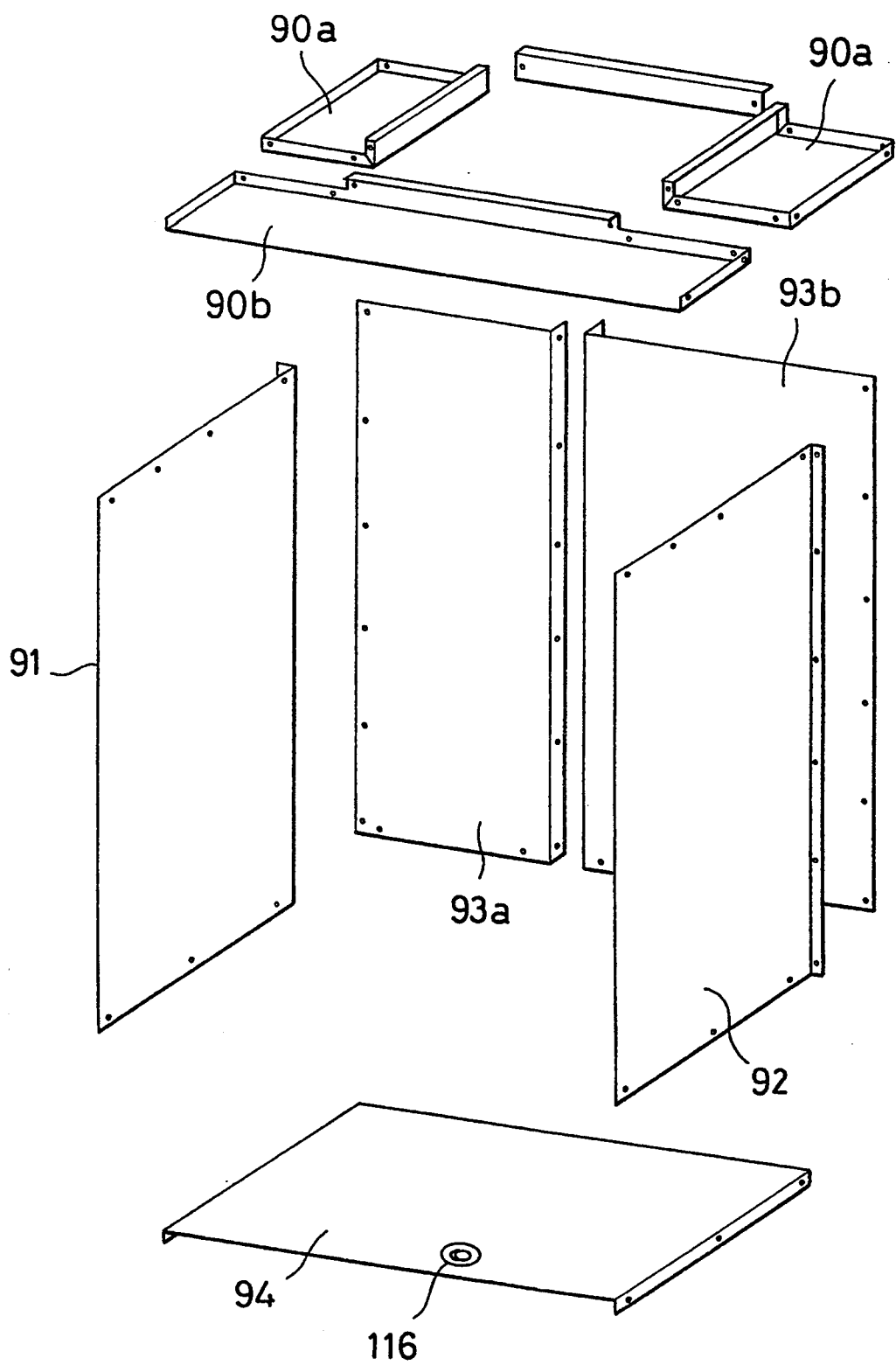
FIG. 20 is an exploded view of a conventional thermal insulation box.

The inner box used in such a large sized professional refrigerator as mentioned above usually has a height of more than 1400 mm. Namely, the rear panels as well as right and left panels of the box are larger than the sheet metal which are limited in size. (The maximum width is 1219 m/m). Therefore, the inner box must be made up of a plurality of these metal sheets, as shown in FIG. 20. The invention permits in a simple way manufacture of an inner box that may be made of less material, as shown in FIGS. 16 and 17.

The inner box of this invention is made up of two sheets of elongate metal 105 and 106, whose long edges are folded in such a way that one edge may engage with the adjacent edge of another sheet to make a wider sheet, as wide as 8 feet. The two sheets, when connected with each other, therefore permits manufacture of an inner box as high as 8 feet.

Next, a procedure for making a body 2A of the inner box is described. Firstly, the two sheets 105 and 106 are given cuts 107 and 108 at predetermined positions in the longer edges. The edges of one sheet 105, including the cuts 107, are folded to form flanges 109a and 109b having V-shaped transverse cross section. On the other hand the edges of another sheet 106, also including the cuts 108, are also folded to form a flat right-angled flange 111 on the side adjacent to the sheet 105 and, on the opposite side, a V-shaped flange 110. Each of the two sheets is folded along lines 11 and 12 connecting the opposite cuts 107 and 108 to form a rectangular U-shaped panel member as shown in FIG. 17. The widths of the flanges 109a, 109b, 110, and 111 are made wider than the depth of the cuts 107 and 108, so that the surfaces 112 anti 113 of the respective flanges will contact each other as the two panel members 105 and 106 are combined. The two sheets are combined by fitting the flat flange 111 into the V-shaped flange 109b and caulked, yielding a single panel having right and left side walls and a rear wall. The combined panel is then folded into a U-shaped main body 2A of the inner box having round corners 121 and 122 with the flanges 112 and 113 still kept in good air tight contact. Lastly, as shown in FIG. 17, a ceiling panel 114 and a bottom panel 115 are inserted into the V-shaped groove of the flange 109a and 110, respectively, and caulked, yielding the inner box 2. A hole 116 is provided as a water drain. The inner box thus formed is then combined with an outer box 3 which has been made independently. Into the space formed in between the inner and outer box is injected an expandable thermal insulation material 5 (such as urethane). The thermal insulation material 5 will spread from the injection point indicated by arrow A in FIG. 19 past the round corners into the rear space and further into the opposite side spaces smoothly. The insulation material spreads smoothly since no protruding flange exists at the corners as is the case in prior art, and hence a good insulation wall may be obtained.

We claim:

1. A thermal insulation box having inner and outer boxes forming a space between said boxes, said inner box defining a thermal insulation compartment with an opening, and a partitioning member provided at said opening of said thermal insulation compartment and partitioning said opening into a plurality of openings wherein:

said partitioning member has an outer shell forming therein a space which communicates with said space between said inner and outer boxes; and wherein said space between said inner and outer boxes and said space inside said partitioning member are integrally filled with a thermal insulation material;

an outlet formed on the back of the partitioning member is provided for allowing gas liberated from said thermal insulation material when expanding to be exhausted therethrough and for serving as a window for checking the expanding insulation material filling said spaces inside the outer shell; and a lid for closing the outlet after completion of the expansion of the insulation material filling said spaces.

2. A thermal insulation box having an outer box and at least two inner boxes forming a space between said boxes, each said at least two inner boxes defining a thermal insulation compartment having an opening, wherein at least one of said at least two thermal insulation compartments has its opening partitioned by a partitioning member into a plurality of openings;

said at least two thermal insulation compartments being separated by at least one thermal insulation wall having a space therein which communicates with said space between said inner and outer boxes;

said partitioning member of said at least one of said at least two thermal insulation compartments having an outer sheell forming therein a space which communicates with said space within said at least one thermal insulation wall and with said space between said inner and outer boxes; and said space inside said partitioning member, said space within said at least one thermal insulation wall, and said space between said inner and outer boxes are integrally filled with a thermal insulation material;

an outlet formed on the back of the partitioning member is provided for allowing gas liberated from said thermal insulation material when expanding to be exhausted therethrough and for serving as a window for checking the expanding insulation material filling said spaces inside the outer shell; and a lid for closing the outlet after completion of the expansion of the insulation material filling said spaces.

3. The thermal insulation box of claim 2, wherein said at least one thermal insulation wall is at least one vertically extending wall, and said at least two thermal insulation compartments comprise at least two compartments defined in part by said at least one vertically extending wall.

4. The thermal insulation box of claim 3, wherein said partitioning member comprises partitioning member portions dividing the respective openings of said at least two compartments defined in part by said at least one vertically extending wall into a plurality of openings of each compartment.

5. The thermal insulation box of claim 4, wherein said at least one thermal insulation wall divides said thermal insulation box such that said at least two thermal insulation compartments are at least two elongated vertically extending thermal insulation compartments, and said partitioning member comprises a plurality of partitioning member portions partitioning the openings of each of said thermal insulation compartments into a plurality of openings.

6. The thermal insulation box of claim 3, wherein said at least one vertically extending wall has a rectangular horizontal cross section.

7. The thermal insulation box of claim 2, wherein said at least one thermal insulation wall comprises at least one vertically extending insulation wall and at least one horizontally extending insulation wall defining in part at least two thermal insulation compartments, said vertically extending wall and said horizontally extending wall each having respective spaces therein in communication with each other such that said thermal insulation material therein is integrally formed in said at least one vertically and horizontally extending walls.

8. The thermal insulation box of claim 7, wherein said partitioning member comprises at least two partitioning member portions for dividing said opening of said at least one thermal insulation compartment into three openings.

9. The thermal insulation box of claims 8, wherein said at least one thermal insulation compartment having said partitioned opening is a substantially L-shaped compartment such that said partitioning member portions divide the opening thereof into three substantially square openings of the same size.

10. The thermal insulation box of claim 7, wherein said at least one partitioning wall defines in part an upper compartment with an opening and at a top part of said thermal insulation box, and said partitioning member dividing said at least one compartment having its opening partitioned into a plurality of openings is disposed at least in part below said upper compartment.

* * * * *